UNITED STATES PATENT OFFICE 1,977,242

SUBSTITUTION DERIVATIVES OF BZL, BZL'-DIBENZANTHRONYL-SELENIDE

Melvin A. Perkins, Milwaukee, Wis., assignor to E. I. du Pont de Nemours & Company, Wilmington, Del., a corporation of Delaware No Drawing. Application June 2, 1933, Serial No. 674,038

19 Claims. (Cl. 260—61)

This invention relates to novel organic compounds and to a process of preparing the same. More particularly, this invention deals with novel substitution derivatives of Bzl,Bzl'-dibenzanthronyl-selenide. The novel products of this invention may be represented by the general formula

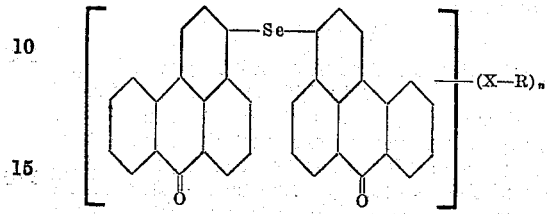

wherein R is hydrogen or an organic radical of the aryl, alkyl, or aralkyl series and X is an inorganic linking atom or radical such as O, S, or NH, and $n$ stands for an integer not greater than 4. Compounds of this general formula are adapted to be fused with alcoholic potash to give the correspondingly substituted isodibenzanthrones.

It is accordingly an object of this invention to produce novel organic compounds which are adapted to be used as intermediates for vat dyestuffs.

It is a further object of this invention to provide a process for manufacturing these novel compounds.

Other and further objects of this invention will appear as the description proceeds.

In accomplishing the objects of my invention, I use a halogen - Bzl,Bzl'- dibenzanthronyl - selenide as initial material. The formation of some of these compounds is described in my copending application Ser. No. 427,654 and in copending application of Thomson, Anderson and Thornley, Ser. No. 558,186. Typical members of this series are the 6,6'-dibromo-Bzl,Bzl'-dibenzanthronyl-selenide and the corresponding dichloro derivative, obtainable by reacting with selenium, in a high boiling solvent, 6,Bzl-dibromo- or 6,Bzl-dichloro-anthraquinone. Other halogen derivatives, however, may be used as initial material; for instance, the tetra-halogen derivative obtained from $x,x$,Bzl-tribromo-benzanthrone, or the monohalogen derivatives which may be obtained by halogenating Bzl,Bzl'-dibenzanthronyl-selenide, or again synthetically, by reacting for instance one mole of 6,Bzl-dihalogen-benzanthrone with one mole of Bzl-benzanthrone - sodium - selenolate. (The latter process is more fully described and claimed in another application by this inventor.)

This initial material is then condensed with an organic compound of the type R—X—H, wherein R is an organic radical of the alkyl, aryl or aralkyl series, and X is a linking atom or group such as O, S or NH. The condensation may be run along parallel lines with known processes for effecting similar condensations between a compound of type R—X—H and an organic halogen compound. For instance, where R—X—H stands for an amine, say, aniline or 1-amino-anthraquinone, the reaction is best effected by heating the reactants in an inert solvent or suspending medium in the presence of an acid absorbing agent and a copper catalyst. In the case of phenols and mercaptans, a similar procedure may be used, except that the copper catalyst is not needed. Where the compound of type R—X—H is a liquid, for instance, in the case of aniline, phenol or methyl alcohol, an excess of the reactant itself may be used in lieu of a solvent. In any of the above cases the heating may be done at atmospheric, subatmospheric or superatmospheric pressure. The temperature employed may be the usual temperature used in analogous condensations, and may vary, depending on the solvent or suspending medium, between 100 and 225° C.

Without limiting my invention to any particular procedure, the following examples in which parts by weight are given will serve to illustrate my preferred mode of operation.

Example 1

10 parts of symmetrical dibromo-dibenzanthronyl-selenide (made by boiling dibromo-benzanthrone (M. P. 257° C.) with selenium in kerosene), 7 parts of 1-amino-anthraquinone, 4 parts of anhydrous sodium acetate, and 0.5 parts of copper powder are suspended in 150 parts of nitrobenzene, and the mixture is refluxed under good agitation for 10 hours. On cooling, a very thick mass is obtained. This is filtered, and the brownish residue is washed with nitrobenzene, alcohol and finally with hot water. Excess copper is removed by known methods, for instance, by slurrying up the filter cake in dilute nitric acid or chlorine water to oxidize the copper into soluble compounds, and refiltering. The final product is a red-brown solid, which dissolves in sulfuric acid with a pure green coloration and is halogen free. It is most probably di-α-anthraquinonyl-diamino-dibenzanthronyl-Bzl,Bzl'-selenide. The yield is nearly quantitative.

If aniline (15 parts) is substituted for the 1-amino-anthraquinone in the above example, a light brown, halogen-free product giving a clear, strong green color in sulfuric acid is obtained. In a similar manner a naphthylamine derivative may be prepared.

1,5-diamino-anthraquinone (3.8 parts) under similar conditions gives a red-brown, friable powder, which still contains one atom of bromine and which gives an emerald green coloration in sulfuric acid.

Substitution of 1-benzoylamino-5-amino-anthraquinone (10 parts) for the 1-amino-anthraquinone in the above example gives a quantitative yield of symmetrical di-(1'-benzoylamino-5'-anthraquinonyl-amino) - Bzl,Bzl' - dibenzanthronyl-selenide as a brownish crystalline powder.

In place of copper powder, cuprous chloride may be used and in place of sodium acetate, other acid binders, such as anhydrous sodium carbonate.

Example 2

10 parts of symmetrical dibromo-Bzl,Bzl'-dibenzanthronyl-selenide are dissolved in 100 parts of molten phenol, and 4 parts of anhydrous potassium carbonate are added. The mixture is heated to reflux for about 10 hours, then cooled, diluted with alcohol, filtered, and the residue is washed with hot alcohol, then with hot water. A yellow-brown solid is obtained. It is substantially halogen free and gives a greenish-blue coloration in sulfuric acid. It is most probably diphenoxy-Bzl,Bzl'-dibenzanthronyl-selenide.

Example 3

10 parts of dibromo-Bzl,Bzl'-dibenzanthronyl-selenide and 10 parts of caustic soda (flakes) are introduced into an iron autoclave together with 380 parts of methyl alcohol, and the charge is heated to 130–135° C. under agitation for 20 hours, then to 140–145° C. for 15 hours longer.

After cooling, the charge is filtered, washed with 400 parts of methanol, and then with hot water until free of alkali. A light brown residue is thus obtained which gives a dull greenish-blue coloration in sulfuric acid and is substantially halogen-free. It is most probably dimethoxy-Bzl,Bzl'-dibenzanthronyl-selenide.

Example 4

30.8 parts of Bzl,Bzl'-dibenzanthronyl-diselenide and 29.9 parts of α-Bzl-dichloro-benzanthrone (made by chlorination of α-chloro-benzanthrone, in turn obtainable synthetically from α-chloro-anthraquinone), are boiled together in 600 parts of o-dichlorobenzene, containing 10 parts of sodium acetate. After 15 hours, the mass is cooled, filtered and washed, first with alcohol, then with hot water. The product is monochloro-Bzl,Bzl'-dibenzanthronyl-selenide.

57 parts of the above product, 25 parts of 1-amino-anthraquinone, 20 parts of anhydrous sodium acetate and 1 part of copper powder are slurried in 1000 parts of nitrobenzene and heated at the boiling point of the mixture for 5 hours. The mass is then cooled, filtered to rid of a small amount of insoluble material, and the filtrate drowned in alcohol. The brownish solid which precipitates out is filtered off, washed with alcohol, and dried. The intermediate thus produced dissolves in sulfuric acid with a dark green coloration and gives a blue melt in alcoholic caustic potash. The latter fusion product is a vat dyestuff forming a violet vat with strong brownish fluorescence, from which cotton is dyed a bluish violet shade between those of dibenzanthrone and isodibenzanthrone. The dyeings are extremely sensitive to water spotting. The intermediate compound is most probably α-anthraquinonyl-amino-Bzl,Bzl'-dibenzanthronyl-selenide.

Example 5

8 parts of α-monochloro-Bzl,Bzl'-dibenzanthronyl-selenide as prepared in Example 4 are slurried in 50 parts of molten phenol. 5 parts of potassium carbonate are added, along with 0.08 parts of copper powder and the mixture is heated to 170–175° C. for 8 hours. After cooling to below 100° C., the charge is drowned in alcohol and the solid filtered off, washed with alcohol and then with water.

The product is a brownish yellow solid and gives an intense greenish-blue coloration in sulfuric acid. Upon fusion in alcoholic potassium hydroxide, a bright blue melt is obtained. The fusion product is a dyestuff which gives a bluish-violet vat and bluish-violet dyeings, similar to those of the mono-anthraquinonyl derivative of Example 4. The intermediate product is most probably mono-phenoxy-Bzl,Bzl'-dibenzanthronyl-selenide.

Example 6

8 parts of the initial material prepared in Example 4 are slurried in 100 parts of aniline. 5 parts of sodium acetate (anhydrous) and 0.1 part of copper powder are then added and the mixture heated to boiling for about 8 hours. Upon cooling, a part of the reaction product can be filtered off and freed of solvent and salts by washing with alcohol and then with hot water. More of the reaction product can be recovered from the filtrate by dilution with alcohol and filtering off the precipitate so formed. The reaction product is a dark reddish-brown powder which gives a bluish-green coloration in sulfuric acid. Upon fusion with alcoholic caustic potash, a dyestuff is obtained which gives a violet-blue vat and powerful blue-violet dyeings, much bluer than those of isodibenzanthrone but somewhat redder than those from the fusion products obtained in Examples 4 and 5.

Example 7

10 parts of brominated Bzl,Bzl'-dibenzanthronly-selenide, containing 17.7% Br and made by bromination of Bzl,Bzl'-dibenzanthronyl-selenide at 0° C. in chloro-sulfonic acid are slurried in 100 parts of freshly distilled aniline. 2.5 parts of anhydrous sodium acetate and 0.2 parts of cupric chloride are added. The mixture is heated to boiling over a three-hour period and boiled for about 4 hours. At the end of this time, the charge is cooled and drowned in excess dilute hydrochloric acid and the olive-brown solid filtered off, washed and dried. It contains the correct percentage of nitrogen for monoanilido-dibenzanthronyl-selenide.

Example 8

10 parts of the starting material used in Example 7, 3.5 parts of 2-naphthylamine, 2.5 parts of anhydrous sodium acetate and 0.1 parts of copper powder are slurried in 100 parts of nitrobenzene and heated to 210–212° C. for about 6 hours. The reaction mass is then cooled, filtered and the residual solid washed with alcohol, then with hot water. A yellowish-brown solid giving a bluish-green color in sulfuric acid is obtained in excellent yield. It is most probably mono-β-naphthylamino - Bzl,Bzl' - dibenzanthronyl-selenide.

*Example 9*

58 parts of the starting material used in Example 7, 23 parts of 1-amino-anthraquinone, 6 parts of dry sodium carbonate and 0.5 parts of copper powder are stirred into 800 parts of nitro-benzene and the mixture refluxed for about 20 hours, cooled and filtered. A brown solid, giving a bluish-green coloration in sulfuric acid, is obtained in low yield. More of the same material can be obtained by diluting the filtrate with two volumes of alcohol. The product is most probably a mono-α anthraquinonyl - imino-Bzl,Bzl'-dibenzanthronyl-selenide, isomeric with that obtained in Example 4.

*Example 10*

43.7 parts of brominated Bzl,Bzl'-benzanthronyl-selenide, containing 15.5% Br and made by brominating Bzl,Bzl'-benzanthronyl-selenide in chlorosulfonic acid and monohydrate at 0° C. and 40 parts of copper sulfate crystals are heated in an autoclave with 400 parts of 28% ammonia water at 170–180° C. for about 20 hours. The solid, after filtering and washing free of alkali, is light brown in color and tests free of halogen. It gives a greenish-blue coloration in sulfuric acid. Upon fusion in alcoholic potassium hydroxide at 135–145° C., a strong bluish-violet dye of the iso-dibenzanthrone series is formed.

It will be understood that many variations and modifications are possible in my preferred mode of procedure, without departing from the spirit of this invention.

I claim:

1. A compound of the general formula

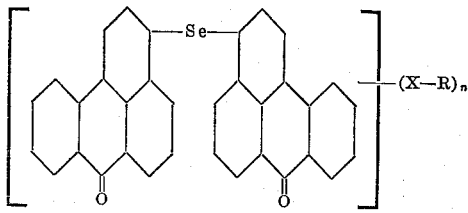

wherein R is an organic radical of the aryl, alkyl or aralkyl series, X stands for O, S or NH and n stands for an integer not greater than 4.

2. A compound of the general formula

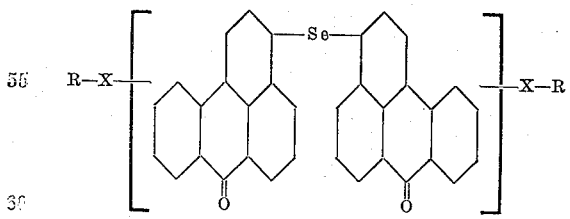

wherein R is an organic radical of the alkyl, aryl or aralkyl series and X stands for O, S, or NH.

3. A compound of the diaryl-diamino-dibenzanthronyl-Bzl,Bzl'-selenide series.

4. A compound of the dianthraquinonyl-diamino-Bzl,Bzl'-dibenzanthronyl-selenide series.

5. Di-α-anthraquinonyl - diamino - Bzl,Bzl'-dibenzanthronyl-selenide.

6. Di-(α-benzoylamino-anthraquinone)-diamino-Bzl,Bzl'-dibenzanthronyl-selenide.

7. The process of producing an organic compound which comprises condensing a halogen-Bzl,Bzl'-dibenzanthronyl-selenide with a compound of the type R—X—H, wherein R stands for hydrogen or an organic radical of the alkyl, aryl or aralkyl series and X stands for O, S or NH when R stands for an organic radical, or X stands for NH when R stands for hydrogen.

8. The process of producing an organic compound which comprises condensing a halogen-Bzl,Bzl'-dibenzanthronyl-selenide with a compound of the type R—X—H, wherein R stands for an organic radical of the alkyl, aryl or aralkyl series while X stands for O, S, or NH.

9. The process of producing an organic compound which comprises condensing a dihalogen-Bzl,Bzl'-dibenzanthronyl-selenide with a compound of the type R—X—H, wherein R stands for hydrogen or an organic radical of the aryl, alkyl or aralkyl series, and X stands for O, S, or NH.

10. The process of producing an organic compound which comprises condensing a dihalogen-Bzl,Bzl'-dibenzanthronyl-selenide with a compound of the type R—NH₂, wherein R stands for an organic radical of the benzene, naphthalene or anthraquinone series.

11. The process of producing an organic compound, which comprises heating in an inert solvent, and in the presence of an acid absorbing agent and a copper catalyst, a dihalogen-Bzl,Bzl'-dibenzanthronyl-selenide and an α-amino-anthraquinone.

12. The process of producing an organic compound, which comprises heating in an inert solvent, and in the presence of an acid absorbing agent and a copper catalyst, a dihalogen-Bzl,Bzl'-dibenzanthronyl-selenide and α-amino-anthraquinone.

13. The process of producing an organic compound, which comprises heating in an inert solvent, and in the presence of an acid absorbing agent and a copper catalyst, a dihalogen-Bzl,Bzl'-dibenzanthronyl-selenide and an α-benzoylamino-α-amino-anthraquinone.

14. A compound of the general formula

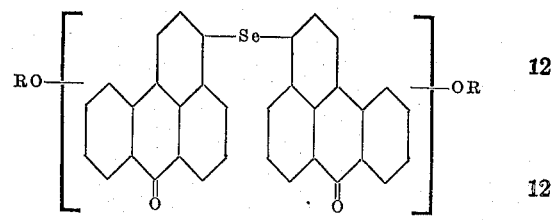

wherein R stands for an alkyl or aryl radical.

15. Diphenoxy-Bzl,Bzl'-dibenzanthronyl - selenide.

16. Dimethoxy-Bzl,Bzl'-dibenzanthronyl - selenide.

17. The process of producing an organic compound, which comprises condensing a dihalogen-Bzl,Bzl'-dibenzanthronyl with an organic compound of the type R—OH, wherein R stands for an alkyl or aryl radical.

18. The process of producing an organic compound, which comprises heating dihalogen-Bzl,Bzl'-dibenzanthronyl-selenide with an excess of phenol in the presence of an acid absorbing agent.

19. The process of producing an organic compound, which comprises heating dihalogen-Bzl,Bzl'-dibenzanthronyl-selenide with an excess of methyl alcohol in the presence of an acid absorbing agent.

MELVIN A. PERKINS.